(12) United States Patent
Nakano et al.

(10) Patent No.: US 9,971,231 B2
(45) Date of Patent: May 15, 2018

(54) DIAPHRAGM DEVICE AND OPTICAL INSTRUMENT

(71) Applicant: SEIKO Precision Inc., Narashino-shi, Chiba (JP)

(72) Inventors: Takashi Nakano, Narashino (JP); Penjan Worapong, Pathumthani (TH)

(73) Assignee: SEIKO PRECISION INC., Matsudo-shi, Chiba (JP)

( * ) Notice: Subject to any disclaimer, the term of this patent is extended or adjusted under 35 U.S.C. 154(b) by 0 days. days.

(21) Appl. No.: 14/944,756

(22) Filed: Nov. 18, 2015

(65) Prior Publication Data

US 2016/0139491 A1 May 19, 2016

(30) Foreign Application Priority Data

Nov. 18, 2014 (JP) ................................. 2014-233965

(51) Int. Cl.
*G03B 9/06* (2006.01)
(52) U.S. Cl.
CPC ..................................... *G03B 9/06* (2013.01)
(58) Field of Classification Search
CPC .................................... G03B 9/12; G03B 9/16
USPC ........................................................ 396/510
See application file for complete search history.

(56) References Cited

U.S. PATENT DOCUMENTS

| 4,335,947 A * | 6/1982 | Lange | G03B 9/22 |
| | | | 396/449 |
| 5,953,550 A * | 9/1999 | Aoshima | G03B 9/10 |
| | | | 396/458 |
| 2004/0239797 A1 * | 12/2004 | Masuda | G03B 9/24 |
| | | | 348/362 |
| 2005/0025478 A1 * | 2/2005 | Fujinaga | G03B 9/10 |
| | | | 396/493 |
| 2005/0134977 A1 * | 6/2005 | Fukuda | G02B 7/1805 |
| | | | 359/835 |
| 2006/0276072 A1 * | 12/2006 | Fukasawa | G03B 9/06 |
| | | | 439/397 |
| 2007/0046905 A1 * | 3/2007 | Takeuchi | G03B 21/2053 |
| | | | 353/97 |

(Continued)

FOREIGN PATENT DOCUMENTS

| JP | 08-328084 A | 12/1996 |
| JP | 2001-033844 A | 2/2001 |

OTHER PUBLICATIONS

Yamagishi, JP2002-122900A, "Diaphragm Mechanism for Camera" English Abstract.*

*Primary Examiner* — Clayton E LaBalle
*Assistant Examiner* — Linda B Smith
(74) *Attorney, Agent, or Firm* — Brinks Gilson & Lione (57) ABSTRACT

A diaphragm device of the present invention includes: a base plate having an aperture portion; a first blade being placed on a plane of the base plate and supported by the base plate to be able to open and close the aperture portion; a second blade being placed on the same plane of the base plate as the first blade, and supported by the base plate to be able to open and close the aperture portion; and a drive ring being formed so as to surround the perimeter of the aperture portion, the driving ring being configured to drive the first blade and the second blade to open and close, wherein the first blade and the second blade perform mutually different actions based on an operation of the drive ring.

6 Claims, 9 Drawing Sheets

(56) References Cited

U.S. PATENT DOCUMENTS

| | | | | |
|---|---|---|---|---|
| 2009/0116832 A1* | 5/2009 | Azuma | ............... | G03B 9/06 |
| | | | | 396/510 |
| 2012/0315028 A1* | 12/2012 | Kanda | ............... | G03B 7/18 |
| | | | | 396/449 |
| 2013/0188236 A1* | 7/2013 | Hashimoto | ............ | G02B 26/02 |
| | | | | 359/230 |
| 2014/0333997 A1* | 11/2014 | Oda | ............... | G02B 21/084 |
| | | | | 359/387 |

* cited by examiner

DIAPHRAGM DEVICE AND OPTICAL INSTRUMENT

RELATED APPLICATIONS

This application claims priority under 35 U.S.C. § 119 to Japanese Patent Application No. 2014-233965 filed on Nov. 18, 2014, the entire content of which is hereby incorporated by reference.

BACKGROUND OF THE INVENTION

Field of the Invention
The present invention relates to a diaphragm device and an optical instrument.
Description of the Related Art
For example, in optical instruments such as digital cameras and still cameras there is provided a diaphragm device that adjusts the amount of light that passes through the lens. A diaphragm device is provided with a base plate having an aperture portion, a plurality of diaphragm blades that are supported such that they are able to open and close the aperture portion, and a drive ring that causes the plurality of aperture blades to open or close. The plurality of diaphragm blades are arranged such that they are interlaced with each other along a circumferential direction. Accordingly, a structure is created in which the amount of light passing through the lens can be adjusted by adjusting the diameter of the diaphragm hole (i.e., the diaphragm aperture) that is formed by the respective diaphragm blades.

The diaphragm device is further provided with either one or a plurality of auxiliary blades separately from the diaphragm blades. The auxiliary blades are used to completely block off any aperture portion in the base plate that has not already been completely closed off by the diaphragm blades alone. The auxiliary blades are supported such that they are able to open up or close off the smallest-diameter diaphragm hole that is formed by the diaphragm blades.

Here, the diaphragm blades and the auxiliary blades are each supported by mutually independent supporting pins. The diaphragm blades and the auxiliary blades receive motive power from the drive ring and this causes them to pivot around their respective supporting pins. Because of this, the direction in which the diaphragm blades perform an opening or closing action and the direction in which the auxiliary blades perform an opening or closing action are the same direction. Based on this structure, a partition plate that separates the diaphragm blades and the auxiliary blades from each other is provided between the diaphragm blades and the auxiliary blades so as to prevent them from obstructing each other during an opening or closing operation (see, for example, Japanese Published Examined Application No. H8-328084 and Japanese Published Examined Application No. 2001-33844).

However, in the above-described conventional technology the problem arises that the size of the diaphragm device in its thickness direction (i.e., in the direction of the optical axis) is increased correspondingly to the size of the provided partition plate.

SUMMARY OF THE INVENTION

The present invention was therefore conceived in view of the above-described circumstances, and it is an object thereof to provide a diaphragm device and an optical instrument in which the device thickness is reduced.

In order to achieve the above-described objects, a diaphragm device according to the present invention includes: a base plate having an aperture portion; a first blade being placed on a plane of the base plate and supported by the base plate to be able to open and close the aperture portion; a second blade being placed on the same plane of the base plate as the first blade, and supported by the base plate be able to open and close the aperture portion; and a drive ring being formed so as to surround the perimeter of the aperture portion, the driving ring being configured to drive the first blade and the second blade to open and close, wherein the first blade and the second blade perform mutually different actions based on an operation of the drive ring.

By employing the above-described structure, it is possible to prevent the first blades and the second blades from obstructing each other during an opening or closing operation without providing a partition plate, as is the case conventionally. Because of this, the thickness of the diaphragm device can be reduced.

The diaphragm device according to the present invention further includes: a first supporting pin pivotably supporting the first blade; and a second supporting pin supporting the second blade to pivot freely, wherein the first blade pivots in one direction around the first supporting pin, while the second blade pivots in the other direction around the second supporting pin.

By employing the above-described structure, it is possible to make the first blades and the second blades perform mutually different actions based on an operation of the drive ring.

The diaphragm device according to the present invention further includes: a first engaging pin engaging with the first blade and, in conjunction with the drive ring and the first supporting pin, causing the first blade to open or close; and a second engaging pin engaging with the second blade and, in conjunction with the drive ring and the second supporting pin, causing the second blade to open or close, wherein the first supporting pin and the second engaging pin are provided on the drive ring, the second supporting pin is provided on the base plate on the outer side in the radial direction of the drive ring relative to the first supporting pin, and the first engaging pin is provided on the base plate on the inner side in the radial direction relative to the first supporting pin.

By employing the above-described structure, it is possible to make the first blades and the second blades perform mutually different actions by means of a simple structure. Moreover, by providing the first engaging pins on the base plate on the inner side in the radial direction relative to the first supporting pins, the size of the diaphragm device in a radial direction can be reduced.

In the diaphragm device according to the present invention, the first supporting pin and the second engaging pin are the same pins, and these same pins have a function of the first supporting pin and a function of the second engaging pin.

By employing the above-described structure, it is possible to reduce the number of parts, and in addition to it becoming possible to achieve a reduction in the size of the diaphragm device, the production costs thereof can also be reduced.

In the diaphragm device according to the present invention, the base plate has an actuator chamber that is configured to transmit motive power to the drive ring, and the second supporting pin is provided in the actuator chamber.

By employing the above-described structure, there is no need to provide extra space on the base plate in order to provide the second supporting pins, so that the size of the diaphragm device can be reduced.

In the diaphragm device according to the present invention, the drive ring has an elongated hole that extends in the circumferential direction of the drive ring, and the first engaging pin is inserted into the elongated hole.

By employing the above-described structure, any increase in the size of the overall diaphragm device in a radial direction can be suppressed even though the width of the drive ring in the radial direction has been increased. Because of this, it is possible to increase the rigidity of the drive ring at the same time as a reduction in the size of the diaphragm device is obtained.

An optical instrument according to the present invention is provided with the above-described diaphragm device.

By employing the above-described structure, it is possible to provide a small-sized optical instrument.

According to the present invention, it is possible to prevent first blades and second blades from obstructing each other during an opening or closing operation. Because of this, there is no need to provide a device in order to separate the first blades and the second blades, and the thickness of the diaphragm device and the optical instrument can be reduced.

DETAILED DESCRIPTION OF THE INVENTION

Hereinafter, an optical instrument and a diaphragm device of the embodiments will be described with reference made to the drawings.

First Embodiment (Optical Instrument)

Firstly, a first embodiment of this invention will be described based on FIG. 1 through FIG. 7.

Figure 1:
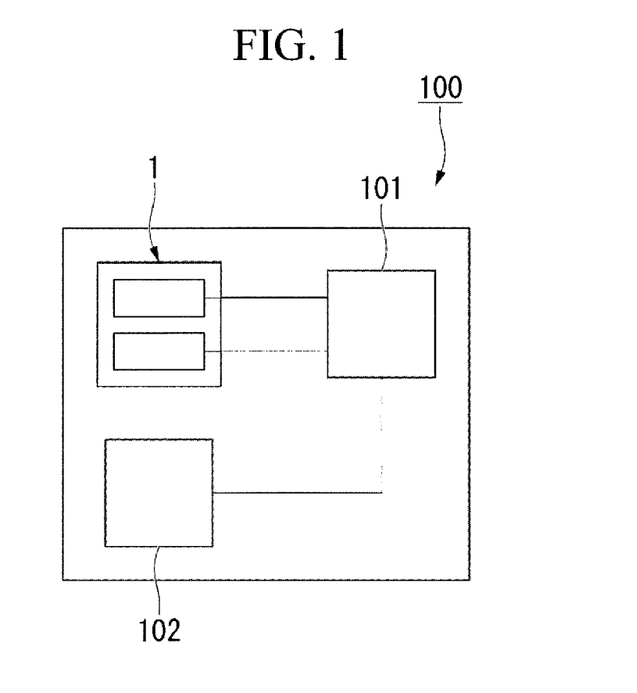
FIG. 1 is a block diagram of an optical instrument according to a first embodiment of the present invention.

FIG. 1 is a block diagram of an optical instrument 100.

As is shown in FIG. 1, the optical instrument 100 is used, for example, as a digital camera or still camera, and is provided with a diaphragm device 1, a control unit 102, and an imaging element 103.

The control unit 102 manages the overall operation of the optical instrument 100, and is provided with a CPU, ROM, RAM, and the like.

The imaging element 103 is, for example, a CCD or CMOS, and converts object images that are formed by light into electrical signals.

Note that, although omitted from FIG. 1, the optical instrument 100 is also provided with a lens or the like that is used to adjust focal length.

(Diaphragm Device)

Figure 2:
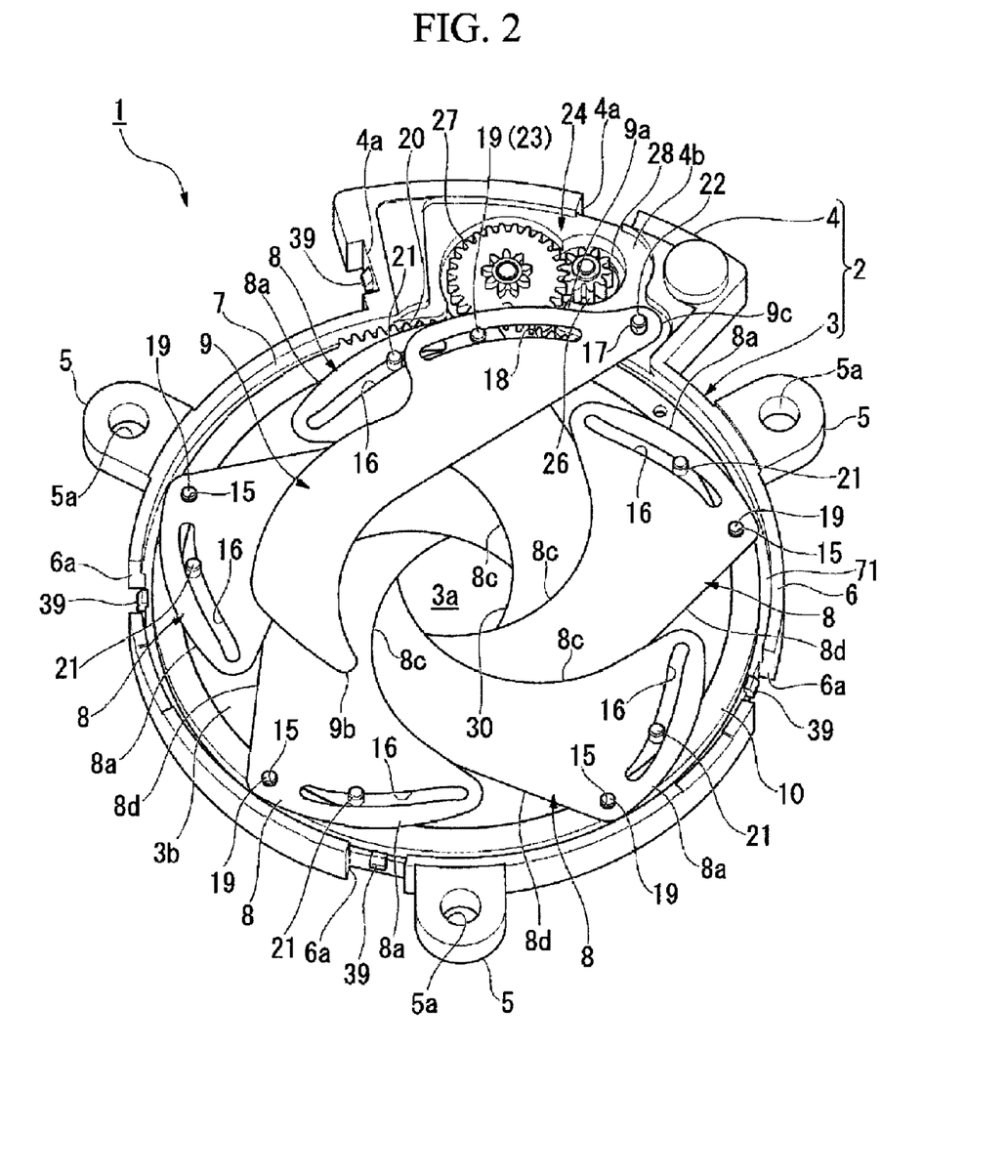
FIG. 2 is a perspective view of a diaphragm device according to the first embodiment of the present invention.
Figure 3:
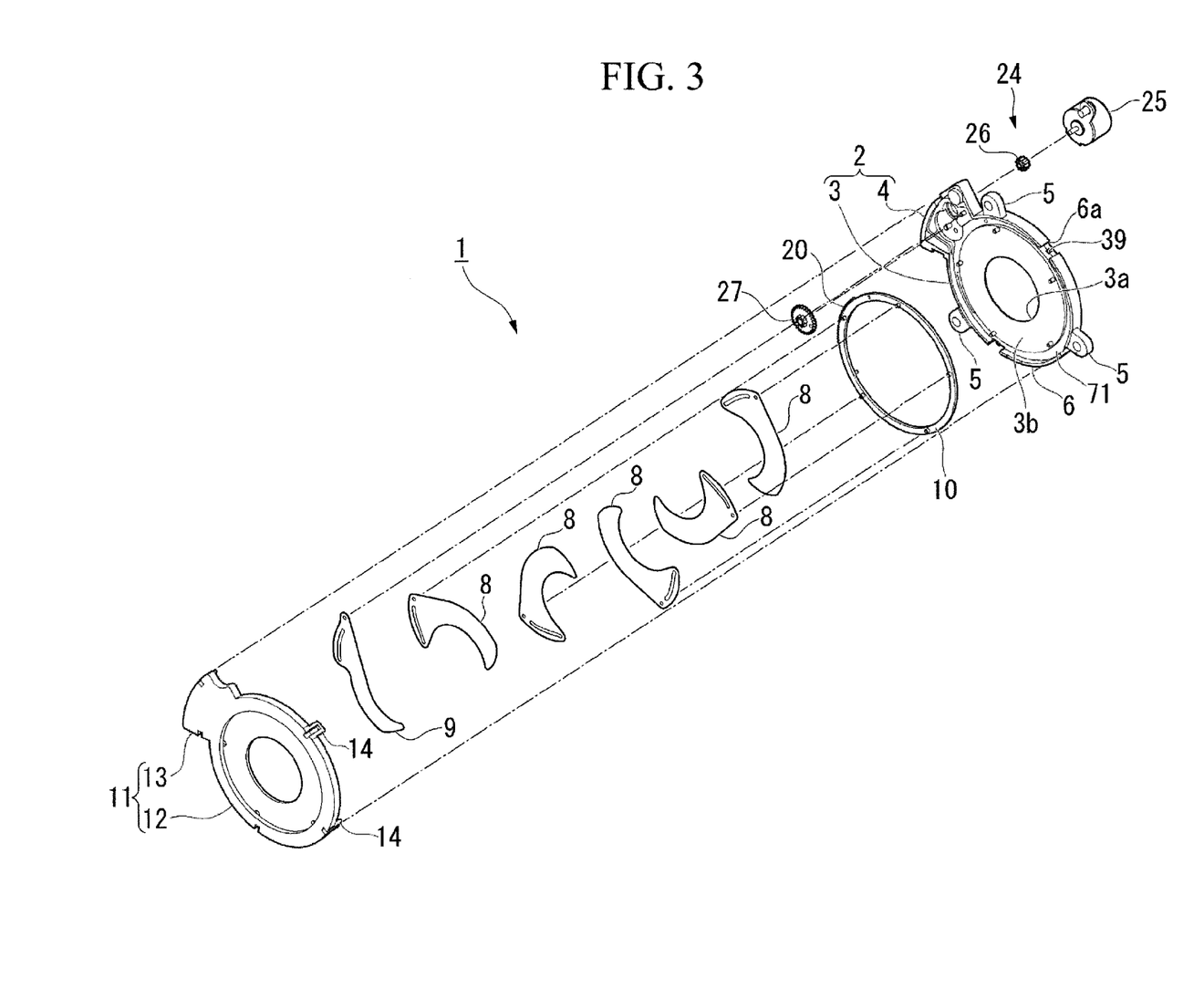
FIG. 3 is an exploded perspective view of the diaphragm device according to the first embodiment of the present invention.

FIG. 2 is a perspective view of the diaphragm device 1, while FIG. 3 is an exploded perspective view of the diaphragm device 1.

As is shown in FIG. 2 and FIG. 3, the diaphragm device 1 is provided with a base plate 2 that is formed, for example, from resin. The base plate 2 is formed by a substantially circular plate-shaped base plate main body 3, and an actuator chamber 4 which is substantially fan-shaped when seen in plan view and is integrally molded to one side of the base plate main body 3.

Note that in the following description, the radial direction of the base plate main body 3 is referred to simply as the radial direction, while the circumferential direction of the base plate main body 3 is referred to simply as the circumferential direction.

An aperture portion 3a is formed in the center in the radial direction of the base plate main body 3. Light that has passed through a lens (not shown) passes through this aperture portion 3a. Three mounting seats 5 are molded integrally with an outer circumferential portion of the base plate main body 3 so as to protrude in the radial direction. The three mounting seats 5 are used to mount the diaphragm device 1, for example, to a housing or the like of the optical instrument 100, a through hole 5a through which a bolt (not shown) can be inserted is formed on the majority of a central portion of the mounting seats 5. The three mounting seats 5 are arranged in the circumferential direction.

Furthermore, a wall portion 6 that is formed so as to stand upright around the outer circumference of the base plate main body 3 is provided on an outer circumferential portion of the base plate main body 3. A blade housing portion 7 is formed by the wall portion 6 and a surface 3b of the base plate main body 3 in the shape of a casing having an open face. A plurality (for example, five in this embodiment) of diaphragm blades 8, an auxiliary blade 9, and a drive ring 10 that causes the diaphragm blades 8 and the auxiliary blade 9 to operate are housed in this blade housing portion 7, and a blade supporting plate 11 is attached from above the blade housing portion 7, the diaphragm blades 8, and the auxiliary blade 9, onto the base plate main body 3.

The blade supporting plate 11 is used to prevent the diaphragm blades 8, the auxiliary blade 9, and the drive ring 10, as well as a rotor pinion 26 and an intermediate gear 27 (described below) from falling off from the base plate 2. The blade supporting plate 11 is formed by a substantially circular plate-shaped supporting plate main body 12, and by an actuator support 13 which is substantially fan-shaped when seen in plan view and is integrally molded to one side of the supporting plate main body 12. The shape of the blade supporting plate 11 matches the shape of the base plate 2.

A plurality of engaging pieces 14 that are each able to deform elastically are formed on outer circumferential portions of the supporting plate main body 12 and on side portions of the actuator support 13 so as to protrude towards the base plate 2. In contrast, notched portions 6a that are able to receive the engaging pieces 14 are formed on the wall portion 6 of the base plate main body 3 at positions that correspond to the engaging pieces 14. In addition, recessed portions 4a that are each able to receive an engaging piece 14 are formed on two side portions of the actuator chamber 4 at positions that correspond to the engaging pieces 14. Engaging pawls 39 that are each able to engage with an engaging piece 14 are formed in the notched portions 6a and the recessed portions 4a. The base plate 2 and the blade supporting plate 11 are snap-fitted together by means of the engaging pieces 14 and the engaging pawls 39.

(Diaphragm Blades)

Figure 4:
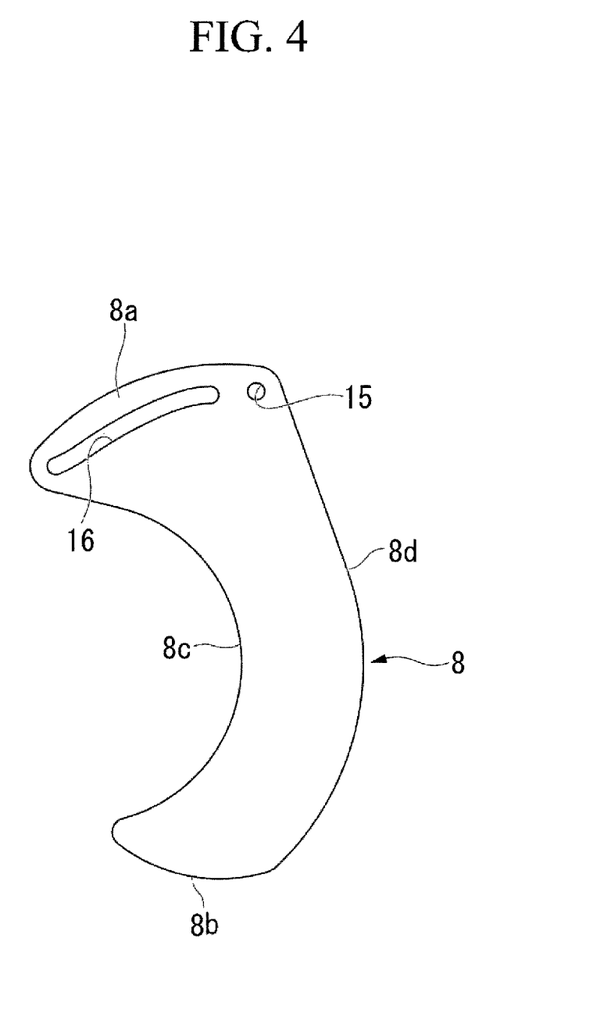
FIG. 4 is a plan view of a diaphragm blade according to the first embodiment of the present invention.
Figure 5:
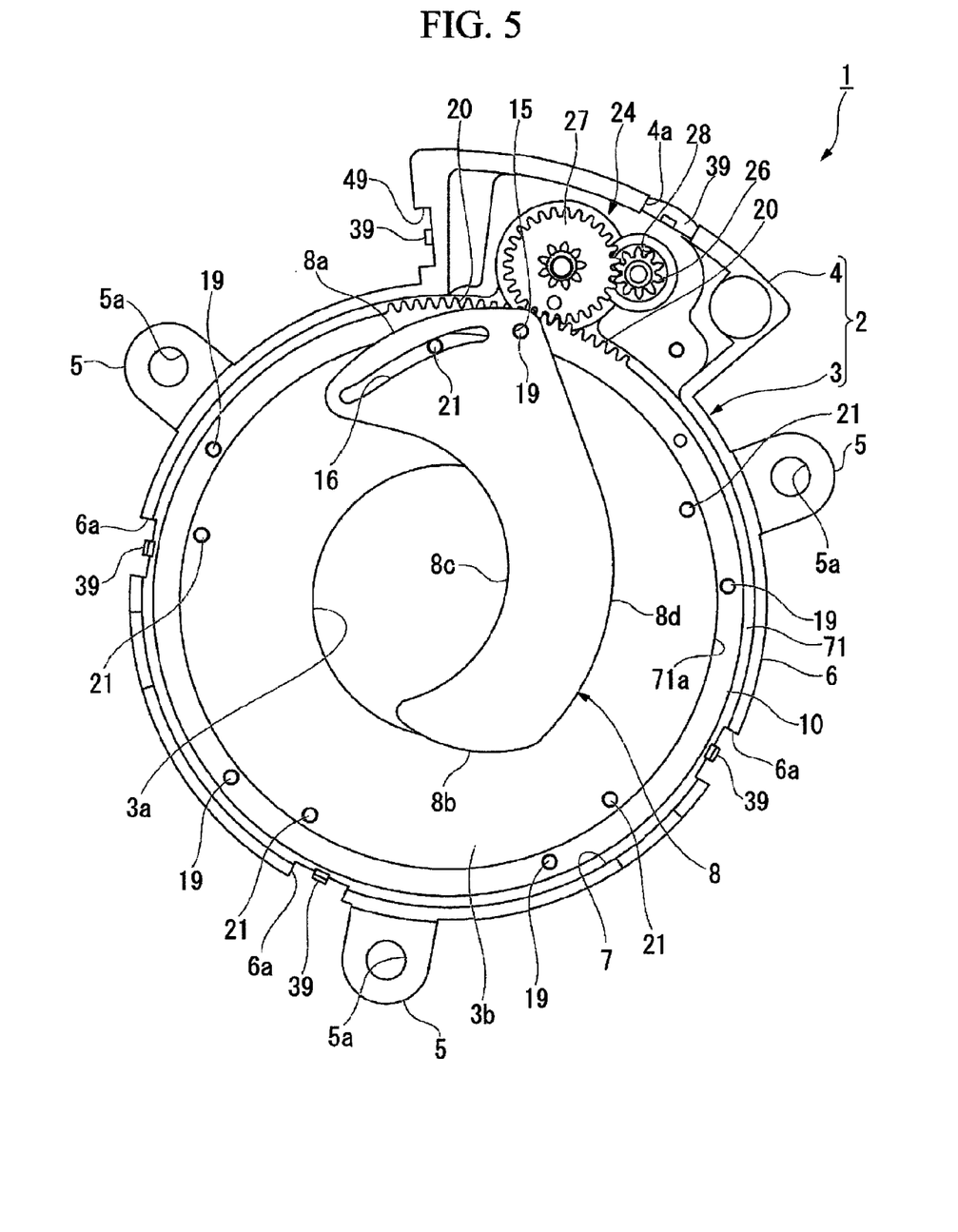
FIG. 5 is a plan view showing a state in which only a single diaphragm blade and a drive ring are housed in a blade housing portion according to the first embodiment of the present invention.

FIG. 4 is a plan view of a diaphragm blade 8, while FIG. 5 is a plan view showing a state in which only a single diaphragm blade 8 and the drive ring 10 are housed inside the blade housing portion 7 of the base plate 2. Note that because the diaphragm blades 8 are all formed having the same shape, only one of the diaphragm blades 8 will be described. The remaining diaphragm blades 8 are allocated the same descriptive symbols and are not described here.

As is shown in FIG. 4 and FIG. 5, the diaphragm blades 8 are used to adjust the aperture amount of the aperture portion 3a that is formed in the base plate 2. Each diaphragm blade 8 is formed from resin and has a slightly curved shape. More specifically, each blade 8 extends from the outer circumferential portion of the base plate main body 3 towards the aperture portion 3a, and also extends across approximately half of the circle formed by the aperture portion 3a while curving so as to roughly follow the perimeter of the aperture portion 3a.

Moreover, the radius of curvature of one side (a first side) 8c in the width direction of the diaphragm blade 8 is set smaller than the radius of curvature of the other side (a second side) 8d in the width direction. As a result, the diaphragm blade 8 is formed such that the width of an end portion thereof that is located on the end portion side of the base plate main body portion 3 (this end portion is referred to below as a base end 8a) is formed wider, while an end portion thereof that is located substantially on the opposite side from the base end 8a sandwiching the approximate center in the blade extending direction (this end portion is referred to below as a distal end 8b) is formed most narrowly. In addition, the diaphragm blade 8 is provided on the surface 3b side of the base plate main body 3 such that the one side 8c in the width direction faces towards the aperture portion 3a side.

Moreover, a supporting hole 15 is formed in the diaphragm blade 8 on the base end 8a side thereof and on the other side 8d in the width direction. Furthermore, a cam groove 16 that extends in the width direction is formed in the diaphragm blade 8 on the base end 8a side thereof at a separate position from the supporting hole 15.

(Auxiliary Blade)

Figure 6:
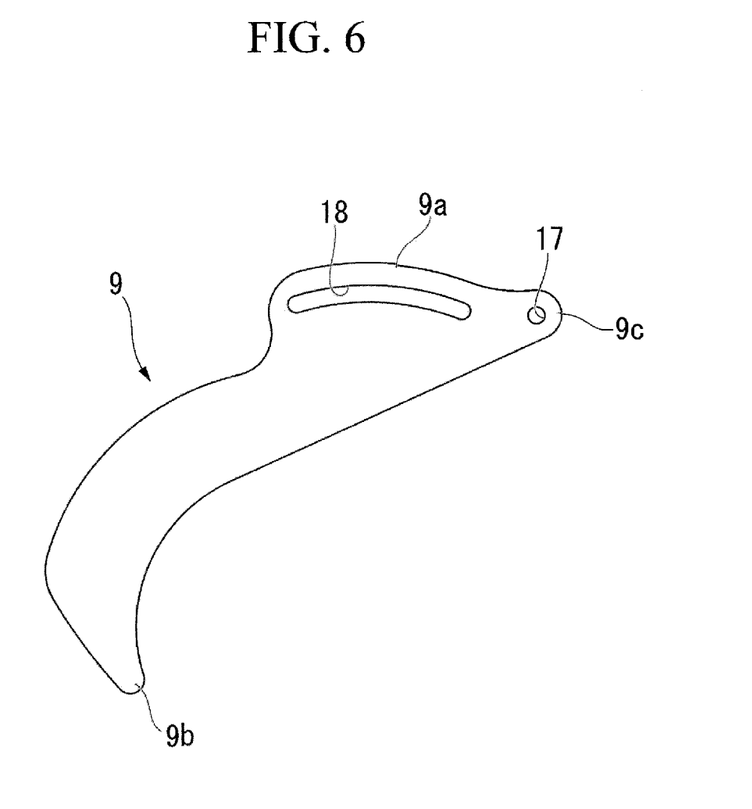
FIG. 6 is a plan view of an auxiliary blade according to the first embodiment of the present invention.

FIG. 6 is a plan view of the auxiliary blade 9.

As is shown in FIG. 2 and FIG. 6, when the aperture portion 3a in the base plate is closed by the diaphragm blades 8, the auxiliary blade 9 is used to completely block off any minute aperture that has not already been completely closed. The auxiliary blade 9 is formed from resin and has a slightly curved shape. More specifically, the auxiliary blade 9 extends towards the aperture portion 3a from a position slightly on the outer side of the outer circumferential portion of the base plate main body 3, and also extends towards the aperture portion 3a while roughly following the perimeter of the aperture portion 3a.

The auxiliary blade 9 extends substantially linearly from an end portion thereof that is located on the base plate main body 3 side (hereinafter, this end portion is referred to as a base end 9a). In addition, an end portion of the auxiliary blade 9 that is located on the opposite side from the base end 9a (hereinafter, this end portion is referred to as a distal end 9b) is formed in a tapered shape that is also slightly curved. The auxiliary blade 9 is formed so that the base end 9a side becomes wide. The auxiliary blade 9 that is formed in this manner is placed on top of the diaphragm blades 8 such that the distal end 9b faces towards the aperture portion 3a side.

An extending piece 9c that extends in the blade extending direction is provided at the base end 9a of the auxiliary blade 9 on the same side thereof in the width direction as the direction in which the distal end 9b faces. A supporting hole 17 is formed in this extending piece 9c. Furthermore, a cam groove 18 that extends in the width direction is formed in the auxiliary blade 9 on the base end 9a side thereof at a separate position from the supporting hole 17.

(Drive Ring)

As is shown in FIG. 2 and FIG. 5, a recessed portion 71 that extends around the inner circumferential surface of the wall portion 6 is formed in the blade housing portion 7 on the surface 3b side of the base plate main body 3, and the drive ring 10 is housed in this recessed portion 71. The drive ring 10 is made from resin, and an inner circumferential edge thereof is formed in a substantially toroidal shape so as to conform to an inner circumferential surface 71a of the recessed portion 71. The drive ring 10 is provided such that it is able to rotate inside the blade housing portion 7. Here, the inner circumferential surface 71a of the recessed portion 71 also functions as a guide that restricts the operating range of the drive ring 10.

A plurality (for example, five in this embodiment) of first supporting pins 19 that correspond to the number of diaphragm blades 8 are provided protruding upwards from the drive ring 10. The respective first supporting pins 19 are arranged equidistantly in the circumferential direction. In addition, each first supporting pin 19 is inserted into the supporting hole 17 of the corresponding diaphragm blade 8. As a result, each diaphragm blade 8 is supported such that it is able to rotate around the corresponding first supporting pin 19.

Moreover, a tooth portion 20 is formed in an outer circumferential edge of the drive ring 10 in a location thereof that corresponds to the actuator chamber 4. This tooth portion 20 is formed such that it is able to mesh with an intermediate gear 27 (described below) that is provided in the actuator chamber 4.

Furthermore, first engaging pins 21 are provided protruding upwards on the base plate main body 3 on the inner side in the radial direction of the drive ring 10. In the same way as the first supporting pins 19, a plurality of these first engaging pins 21 (for example, five in this embodiment) are provided so as to match the number of diaphragm blades 8, and are arranged equally distantly in the circumferential direction. Each first engaging pin 21 is inserted into the cam groove 16 of the corresponding diaphragm blade 8. Namely, each of the first engaging pins 21 is shaped so as to enable it to engage with the corresponding diaphragm blade 8 so that, as a result, the operating range of each diaphragm blade 8 is restricted.

Based on this structure, as is shown in detail in FIG. 2, the respective diaphragm blades 8 are arranged such that they are interlaced with each other, namely, such that the distal end 8b sides thereof overlap each other sequentially in the circumferential direction. As a result of this, a diaphragm hole 30 is surrounded whose perimeter is formed by the sides 8c in the width direction of the respective diaphragm blades 8.

On the other hand, a second supporting pin 22 is provided protruding upwards on a surface 4b of the actuator chamber 4 which is on the same plane as the surface 3b of the base plate main body 3. More specifically, the second supporting pin 22 is provided protruding upright from the surface 4b of the actuator chamber 4 on one end side thereof in the circumferential direction and adjacently to the base plate main body 3. This second supporting pin 22 is inserted into the supporting hole 17 in the auxiliary blade 9. As a result, the auxiliary blade 9 is supported such that it is able to pivot around the second supporting pin.

Moreover, the first supporting pin 19 is also inserted into the cam groove 18 in the auxiliary blade 9, and thereby restricts the operating range of the auxiliary blade 9. Namely, the first supporting pin 19 also functions as a second engaging pin 23 that restricts the operating range of the auxiliary blade 9.

(Actuator Chamber)

As is shown in FIG. 2 and FIG. 3, an actuator 24 that is used to operate the drive ring 10 is mounted in the actuator chamber 4. The actuator 24 is provided with a motor 25, a rotor pinion 26 that is attached to a rotation shaft 29 of the motor 25, and an intermediate gear 27 that meshes with the rotor pinion 26.

The motor 25 is placed on the opposite side of the actuator chamber 4 from the surface 4b. A through hole 28 having a smaller diameter than the outer diameter of the motor 25 is formed in the actuator chamber 4 at a position that corresponds to the motor 25. The rotation shaft 29 of the motor 25 faces the surface 4b side of the actuator chamber 4 via this through hole 28. In addition, the rotor pinion 26 and the intermediate gear 27 are located on the surface 4b side of the actuator chamber 4.

Moreover, the tooth portion 20 of the drive ring 10 meshes with the intermediate gear 27. The intermediate gear 27 decelerates the rotation of the motor 25 (i.e., the rotor pinion 26) and then transmits it to the drive ring 10. As a result, the drive force from the motor 25 is transmitted to the drive ring 10 via the rotor pinion 26 and the intermediate gear 27, and this results in the drive ring 10 being rotated.

(Operation of the Diaphragm Device)

Next, an operation of the diaphragm device 1 will be described based on FIGS. 7A to 7C.

Figure 7A:
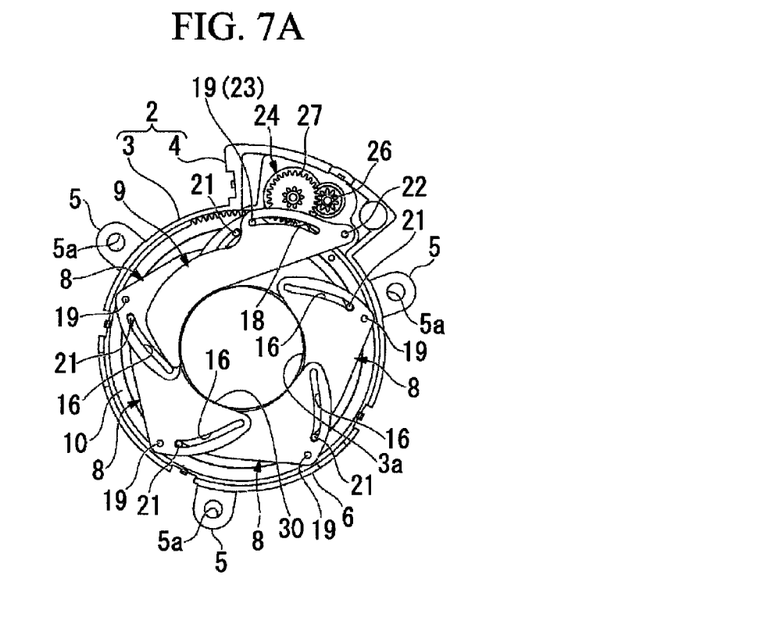
FIG. 7A is an operation explanatory view of the diaphragm device according to the first embodiment of the present invention and showing a fully open state.
Figure 7B:
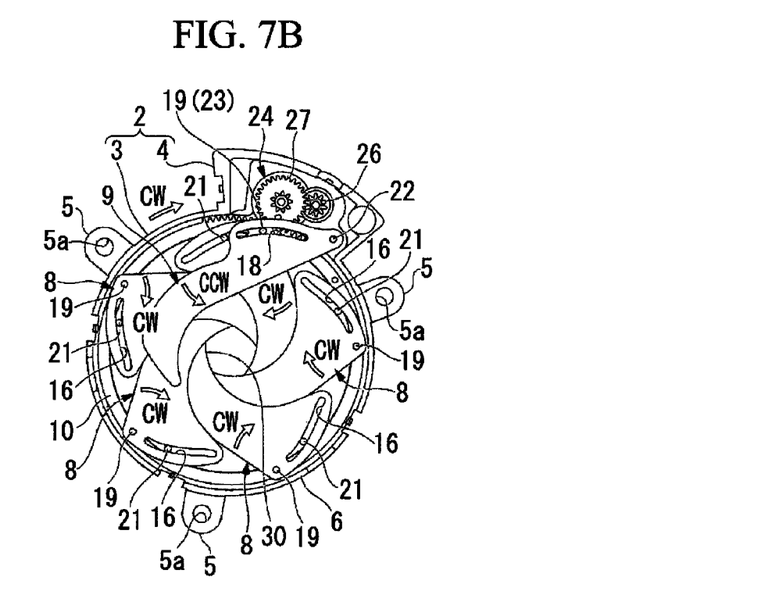
FIG. 7B is an operation explanatory view of the diaphragm device according to the first embodiment of the present invention and showing an intermediate diaphragm state.
Figure 7C:
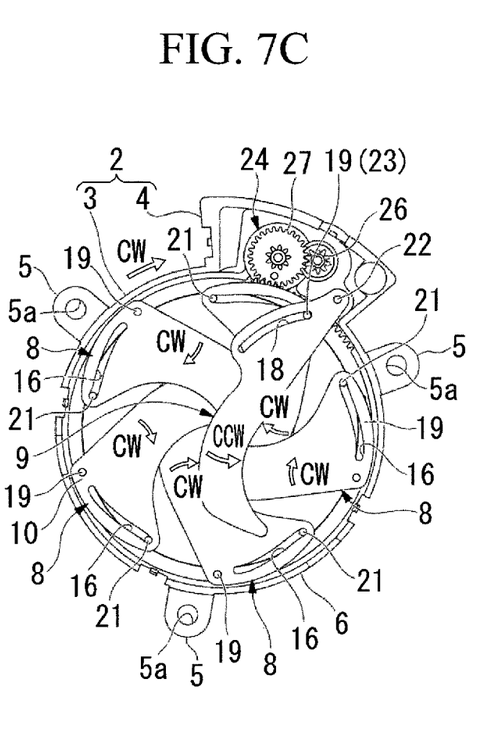
FIG. 7C is an operation explanatory view of the diaphragm device according to the first embodiment of the present invention and showing a fully closed state.

FIGS. 7A to 7C are operation explanatory views of the diaphragm device 1, with FIG. 7A showing a fully open state, FIG. 7B showing an intermediate diaphragm state, and FIG. 7C showing a fully closed state.

Note that the fully open state is one in which the area of the aperture of the diaphragm hole 30 (see FIG. 2) formed by the diaphragm blades 8 is at maximum. The fully closed state is one in which the area of the aperture of the diaphragm hole 30 is at minimum, and this minimized diaphragm hole 30 is then completely closed off by the auxiliary blade 9. The intermediate diaphragm state is one in which the area of the aperture of the diaphragm hole 30 is an intermediate size between the fully open state and the fully closed state.

As is shown in FIG. 7A, in the fully open state the first supporting pins 19 (i.e., the second engaging pin 23) of the drive ring 10 and the first engaging pins 21 are at their closest positions to each other, while the first supporting pin 19 and the second supporting pin 22 are at their furthest positions from each other. In other words, the first engaging pins 21 are located at their closest positions to the first supporting pins 19 in the cam grooves 16 of the diaphragm blades 8. Moreover, the first supporting pin 19 (i.e., the second engaging pin 23) is located at its furthest position from the second supporting pin 22 in the cam groove 18 of the auxiliary blade 9. Note also that in this fully open state the size of the diaphragm hole 30 is slightly larger than the size of the aperture portion 3a of the base plate 2.

As is shown in FIG. 7B, if the motor 25 is driven when the diaphragm hole 30 is in the fully open state so that the drive ring 10 is rotated in one direction CW (i.e., in a clockwise direction in this embodiment), the first supporting pins 19 (i.e., the second engaging pins 23) are moved in a direction in which they move away from the first engaging pins 21, and the first supporting pin 19 (i.e., the second engaging pin 23) is moved in a direction in which it approaches the second supporting pin 22.

As a result of this, the diaphragm blades 8 are pivoted in the one direction CW (i.e., in a clockwise direction) around the first supporting pins 19. In contrast, the auxiliary blade 9 is pivoted in another direction CCW (i.e., in a counter-clockwise direction in this embodiment) around the second supporting pin 22.

Here, the angle of the extending direction of the cam groove 16 that is formed in each diaphragm blade 8 relative to the rotation direction of the drive ring 10 (i.e., the tangential direction of the drive ring 10) is large. In contrast, the angle of extending direction of the cam groove 18 that is formed in the auxiliary blade 9 relative to the rotation direction of the drive ring 10 is small. Consequently, even though the rotation angle of the drive ring 10 is the same for both of the diaphragm blades 8 and the auxiliary blade 9, the rotation angle (i.e., the displacement amount) of the diaphragm blades 8 is large, while the rotation angle of the auxiliary blade 9 is small. As a result, in the intermediate diaphragm state, the diaphragm hole 30 is not closed off by the auxiliary blade 9.

As is shown in FIG. 7C, if the drive ring 10 is rotated further in the one direction CW, the first supporting pins 19 (i.e., the second engaging pins 23) of the drive ring 10 and the first engaging pins 21 are at their furthest positions from each other, while the first supporting pin 19 and the second supporting pin 22 are at their closest positions to each other. In other words, the first engaging pins 21 are located at their furthest positions from the first supporting pins 19 in the cam grooves 16 of the diaphragm blades 8. Moreover, the first supporting pin 19 (i.e., the second engaging pin 23) is located at its closest position to the second supporting pin 22 in the cam groove 18 of the auxiliary blade 9. As a result, the diaphragm device 1 is in the fully closed state.

Note that when the diaphragm device 1 is changed from the fully closed state to the fully open state, the above-described tasks are performed in reverse sequence.

In this way, in the above-described first embodiment, the first supporting pins 19 (i.e., the second engaging pin 23) are provided in the drive ring 10. Moreover, the first engaging pins 21 are provided on the base plate main body 3 on the inner side in the radial direction of the drive ring 10. Furthermore, the second supporting pin 22 is provided in the actuator chamber 4, which is on the outer side in the radial direction from the drive ring 10. Because of this, the direction in which the diaphragm blades 8 are pivoted around the first supporting pins 19 by a single rotation of the drive ring 10 is the opposite of the direction in which the auxiliary blade 9 is pivoted around the second supporting pin 22 by this same rotation of the drive ring 10. In other words, the diaphragm blades 8 and the auxiliary blade 9 perform mutually different actions as the result of a single operation performed by the drive ring 10. Accordingly, the diaphragm blades 8 and the auxiliary blade 9 are prevented from obstructing each other when the diaphragm blades 8 and the auxiliary blade 9 are performing an opening or closing action. Consequently, there is no need for another device to be provided between the diaphragm blades 8 and the auxiliary blade 9 in order to separate these from each other, and the thickness of the diaphragm device 1 can be made thinner.

Moreover, in the diaphragm device 1 a structure is employed in which, by providing the first supporting pins 19 (i.e., the second engaging pins 23) on the drive ring 10, and by providing the first engaging pins 21 on the base plate main body 3 on the inner side in the radial direction of the drive ring 10, as few components as possible are placed on the outer side in the radial direction of the drive ring 10. Because of this, it is possible to attain a smaller size in the radial direction, while also achieving a thinner thickness in the diaphragm device 1.

Moreover, one of the first supporting pins 19 that are provided on the drive ring 10 in order to support the diaphragm blades 8 also functions as the second engaging pin 23 that regulates the operating range of the auxiliary blade 9. Because of this, the number of parts forming the diaphragm device 1 can be reduced, and in addition to it becoming possible to achieve a reduction in the size of the diaphragm device 1, the production costs thereof can also be reduced.

Moreover, because the second supporting pin 22 is provided in the actuator chamber 4, there is no need to provide extra space on the base plate 2 (i.e., on the base plate main body 3) in order for this second supporting pin 22 to be provided. This enables the size of the diaphragm device 1 to be further reduced.

Furthermore, by forming the cam groove 16 in each diaphragm blade 8 and inserting the first engaging pins 21 in these cam grooves 16, the diaphragm blades 8 and the first engaging pins 21 are engaged with each other. Furthermore, by forming the cam groove 18 in the auxiliary blade 9 and inserting the first supporting pin 19 (i.e., the second engaging pin 23) in this cam groove 18, the auxiliary blade 9 and the first supporting pin 19 (i.e., the second engaging pin 23) are engaged with each other. Because of this, by forming the respective cam grooves 16 and 18 with a high level of precision, it is possible to precisely regulate the operations of the respective blades 8 and 9.

Second Embodiment

Next, a second embodiment of this invention will be described based on FIG. 8. Note that aspects that are the same as in the first embodiment are allocated the same descriptive symbols and any description thereof is omitted.

Figure 8:
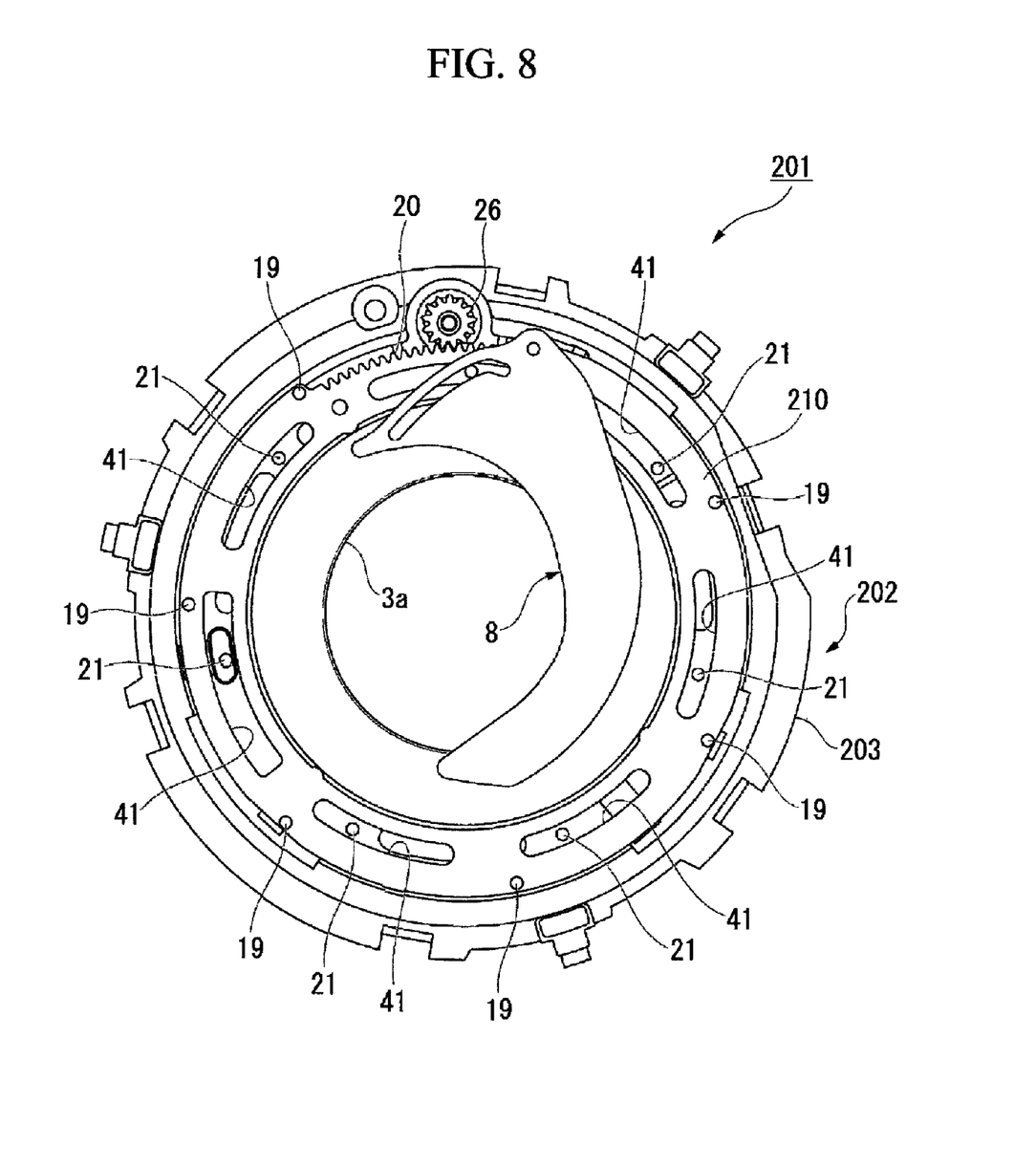
FIG. 8 is a plan view showing a state in which only a single diaphragm blade and a drive ring are housed in a blade housing portion according to a second embodiment of the present invention.

FIG. 8 is a plan view showing a state in which only one diaphragm blade 8 and a drive ring 210 are housed in the blade housing portion 7 of the base plate 2 of a diaphragm device 201 according to the second embodiment, and this view corresponds to the above-described FIG. 5.

As is shown in FIG. 8, the second embodiment differs from the above-described first embodiment in that the shape of the drive ring 210 of the second embodiment is different from the shape of the drive ring 10 of the first embodiment. Moreover, the second embodiment also differs from the first embodiment in that, in the first embodiment, drive force from the motor 25 is transmitted to the drive ring 10 via the rotor pinion 26 and the intermediate gear 27, however, in the second embodiment, drive force from the motor 25 is transmitted to the drive ring 210 solely via the rotor pinion 26.

More specifically, the width in the radial direction of the drive ring 210 is set wider than the width of the drive ring 10 of the first embodiment. In addition, elongated holes 41 that extend in an elongated elliptical shape in the circumferential direction are formed in positions that correspond to the first engaging pins 21 that are provided on a base plate 202. The first engaging pins 21 are inserted into these elongated holes 41. The width in the radial direction of the elongated holes 41 of the drive ring 210 is set sufficiently greater than the diameter of the first engaging pins 21.

In addition to this, a structure is employed in which the intermediate gear 27 of the first embodiment is omitted, and the tooth portion 20 of the drive ring 210 is made to mesh directly with the rotor pinion 26. Because of this, the outer diameter of the drive ring 210 can be set to a larger size corresponding to the amount obtained by omitting the intermediate gear 27.

Moreover, the outer diameter of a base plate main body 203 of the base plate 202 is also set to a larger size to correspond to the increase in the drive ring 210. In addition, unlike the above-described first embodiment, the actuator chamber 4 is not provided, and the rotor pinion 26 is provided inside the base plate main body 203.

Accordingly, according to the above-described second embodiment, by forming the elongated holes 41 in the drive ring 210, the width in the radial direction of the drive ring 210 can be set wider compared to the above-described first embodiment, without causing the drive ring 210 to interfere with the first engaging pins 21. Because of this, it is possible to increase the rigidity of the drive ring 210 at the same time as a reduction in the size of the diaphragm device 201 is obtained.

Moreover, the width in the radial direction of the elongated holes 41 in the drive ring 210 is set sufficiently larger than the diameter of the first engaging pins 21. Because of this, the rotation of the drive ring 210 from is not hindered by the first engaging pins 21, so that the drive ring 210 is able to rotate smoothly.

Furthermore, a structure is employed in which the intermediate gear 27 of the first embodiment is omitted, and the tooth portion 20 of the drive ring 210 is made to mesh directly with the rotor pinion 26. Consequently, the outer diameter of the drive ring 210 is set to a larger size corresponding to the amount obtained by omitting the intermediate gear 27. Because of this, sufficient torque of the drive ring 210 can be secured even though the intermediate gear 27 has been omitted.

Moreover, because the actuator chamber 4 is omitted from the base plate 202, an overall reduction in the size of the base plate 202 can be achieved even though the outer diameter of the base plate main body 203 has been increased in accordance with the size of the drive ring 210.

Note that the present invention is not limited to the above-described embodiments, and various modifications may be made to the above-described embodiments in so far as they do not depart from the scope of the present invention.

For example, in the above-described embodiments, a case is described in which the optical instrument 100 is used, for example, as a digital camera or still camera or the like. However, the present invention is not limited to this and the optical instrument 100 may be used for various applications.

Moreover, in the above-described embodiments, a case is described in which the cam grooves 16 are formed in the diaphragm blades 8, and the diaphragm blades 8 are made to engage with the first engaging pins 21 by inserting the first engaging pins 21 into these cam grooves 16. Furthermore, a case is also described in which the cam groove 18 is formed in the auxiliary blade 9, and the auxiliary blade 9 is made to engage with the first supporting pin 19 by inserting the first supporting pin 19 (i.e., the second engaging pin 23) into this cam groove 18. However, the present invention is not limited to this and it is also possible to employ a structure in which a plurality of engaging pins 21 and 23 are provided without the respective cam grooves 16 and 18 being formed in the respective blades 8 and 9, and the operations of the diaphragm blades 8 and the auxiliary blade 9 are regulated by these engaging pins 21 and 23.

For example, it is also possible to provide the engaging pins 21 and 23 for the respective blades 8 and 9 in predetermined positions on the forward side in the rotation direction of the drive rings 10 and 210, and in predetermined positions on the rearward side in this rotation direction. It is also possible to employ a structure in which the respective blades 8 and 9 are operated by being pressed against these engaging pins.

Furthermore, in the above-described embodiments, a case is described in which the first supporting pins 19 that are provided on the drive rings 10 and 210 also function as the second engaging pins 23 that regulate the operating range of the auxiliary blade 9. However, the present invention is not limited to this, and it is also possible for the second engaging pins 23 to be provided separately from the first supporting pins 19.

Moreover, in the above-described embodiments, a case is described in which five diaphragm blades 8 are provided and the aperture amount of the aperture portion 3a (i.e., the diaphragm hole 30) in the base plates 2 and 202 are adjusted by these five diaphragm blades 8. However, the number of diaphragm blades 8 is not limited to five, and can be set to a desired number.

Furthermore, in the above-described embodiments, a case is described in which the first supporting pins 19 (i.e., the second engaging pins 23) are provided on the drive ring 10, and the first engaging pins 21 are provided on the base plate main body 3 on the inner side in the radial direction of the drive ring 10, and the second supporting pin 22 is provided in the actuator chamber 4 that is on the outer side in the radial direction of the drive ring 10. In addition, a case is described in which the direction in which diaphragm blades 8 are pivoted around the first supporting pins 19 by a single rotation of the drive ring 10, and the direction in which the auxiliary blade 9 is pivoted around the second supporting pin 22 by this same rotation of the drive ring 10 are mutually opposite each other. However, the present invention is not limited to this, and it is sufficient if a structure is employed in which the diaphragm blades 8 and the auxiliary blade 9 are made to perform mutually different actions by a single rotation of the drive ring 10.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. A diaphragm device comprising:
   a base plate having an aperture portion;
   a first blade being placed on the base plate for rotation in a plane around a fulcrum of the first blade to open and close the aperture portion;
   a second blade being placed on the base plate for coplanar rotation in the plane around a fulcrum of the second blade to open and close the aperture portion, the first and second blades being configured to rotate in opposite directions in the plane;
   a drive ring being supported on the base plate and configured to be driven to rotate on the base plate around the aperture portion, the driving ring being in cam-linkage with the first and second blades to rotate the first blade and the second blade in the opposite directions to open and close the aperture portion;
   a first supporting pin pivotably supporting the fulcrum of the first blade and fixed on the drive ring for rotation on the base plate together with rotation of the drive ring; and
   a second supporting pin pivotably supporting the fulcrum of the second blade and fixed on the base plate on a radially outer side of the drive ring.

2. The diaphragm device according to claim 1, further comprising:
   a first engaging pin fixed on the base plate on a radially inner side of the drive ring, the first engaging pin being in cam-linkage with the first blade such that the first engaging pin transforms a rotational movement of the supporting pin around the aperture portion into a rotational movement of the first blade around the fulcrum of the first blade; and
   a second engaging pin fixed on the drive ring for rotation on the base plate together with rotation of the drive ring, the second engaging pin being in cam-linkage with the second blade such that the second engaging pin transforms a rotational movement of the second engaging pin around the aperture portion into a rotational movement of the second blade around the fulcrum of the second blade.

3. The diaphragm device according to claim 1, wherein the base plate has an actuator chamber that is configured to transmit motive power to the drive ring, and the second supporting pin is provided in the actuator chamber.

4. The diaphragm device according to claim 2, further comprising an additional first blade and an additional first engaging pin fixed on the base plate on a radially inner side of the drive ring, wherein the second engaging pin pivotably supports a fulcrum of the additional first blade, and the additional first engaging pin being in cam-linkage with the additional first blade such that the additional first engaging pin transforms a rotational movement of the second engaging pin around the aperture portion into a rotational movement of the additional first blade around the fulcrum of the additional first blade.

5. The diaphragm device according to claim 2, wherein the drive ring has an elongated hole shaped in a circular arc coaxial with a rotational path of the drive ring around the aperture portion, and the first engaging pin is inserted into the elongated hole.

6. An optical instrument comprising a diaphragm device including:
   a base plate having an aperture portion;
   a first blade being placed on the base plate for rotation in a plane around a fulcrum of the first blade to open and close the aperture portion;
   a second blade being placed on the base plate for coplanar rotation in the plane around a fulcrum of the second blade to open and close the aperture portion, the first and second blade being configured to rotate in opposite directions in the plane;

a drive ring being supported on the base plate and configured to be driven to rotate on the base plate around the aperture portion, the driving ring being in cam-linkage with the first and second blades to rotate the first blade and the second blade in the opposite directions to open and close the aperture portion; and a first supporting pin pivotably supporting the fulcrum of the first blade and fixed on the drive ring for rotation on the base plate together with rotation of the drive ring; and a second supporting pin pivotably supporting the fulcrum of the second blade and fixed on the base plate on a radially outer side of the drive ring.

\* \* \* \* \*